US008740146B2

(12) United States Patent
Benthien et al.

(10) Patent No.: US 8,740,146 B2
(45) Date of Patent: Jun. 3, 2014

(54) COVER PANEL FOR AN AIRCRAFT, MORE PARTICULARLY A LANDING GEAR COVER PANEL FOR A CARGO PLANE

(75) Inventors: Hermann Benthien, Sottrum (DE); Björn Bertram, Bremen (DE); Sandra Kuckuck, Stuhr (DE); Frank Gustävel, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 1312 days.

(21) Appl. No.: 12/457,076

(22) Filed: Jun. 1, 2009

(65) Prior Publication Data

US 2009/0308976 A1 Dec. 17, 2009

Related U.S. Application Data

(60) Provisional application No. 61/060,819, filed on Jun. 12, 2008.

(51) Int. Cl.
*B64C 1/14* (2006.01)

(52) U.S. Cl.
USPC ...................................... 244/129.4

(58) Field of Classification Search
USPC ............... 244/129.4, 101, 102 R, 107, 137.1
See application file for complete search history.

(56) References Cited

U.S. PATENT DOCUMENTS

| | | | | |
|---|---|---|---|---|
| 1,586,463 A * | 5/1926 | Paquette | ........................ | 190/28 |
| 1,733,973 A * | 10/1929 | Arnold et al. | ................. | 244/107 |
| 2,180,462 A * | 11/1939 | De Seversky | ............ | 244/102 R |
| 3,075,234 A | 1/1963 | Speakman | | |
| 3,335,981 A * | 8/1967 | Pauli et al. | ................ | 244/102 R |
| 7,188,804 B1 * | 3/2007 | Boetto | .......................... | 244/101 |
| 7,422,047 B1 * | 9/2008 | McDonald | ................. | 160/229.1 |
| 8,074,930 B2 * | 12/2011 | Sibley | ........................ | 244/129.5 |
| 8,113,565 B2 * | 2/2012 | Zeuner et al. | ................... | 296/32 |

FOREIGN PATENT DOCUMENTS

DE    10 2004 034 903    2/2006

OTHER PUBLICATIONS

German examination report dated Nov. 16, 2010 in DE 2008 027 956.0-22.

* cited by examiner

*Primary Examiner* — Valentina Xavier
(74) *Attorney, Agent, or Firm* — Jenkins, Wilson, Taylor & Hunt, P.A.

(57) ABSTRACT

The invention relates to a cover panel for a landing gear for an aircraft with at least one pivotal closable flap 6, 7.
According to the invention the at least one flap 6, 7 is attached for swivel movement to the fuselage cell 2 of the aircraft by means of at least one multi-articulated joint 8, 9, 13 wherein the multi-articulated joint 8, 9, 13 is constructed with a number of individual joints seated on a shaft 17, similar to a piano hinge, and a mechanical play increases preferably uniformly starting from a middle individual joint 14 towards the outer individual joints 15, 16.
As a result of the mechanical play which increases within the multi-articulated joint 8, 9, 13 from the middle individual joint 14 to the two outer individual joints 15, 16 in the direction of the x-axis or aircraft longitudinal axis, a substantial mechanical isolation of the cover panel from any possible fuselage cell movements is provided. The flap 7 has at least in the area of one side edge an anti-lift security mechanism 26 in order to prevent aerodynamically conditioned flapping and lifting movements of the flap 7 in the direction of the aircraft vertical axis or z-axis.

12 Claims, 3 Drawing Sheets

COVER PANEL FOR AN AIRCRAFT, MORE PARTICULARLY A LANDING GEAR COVER PANEL FOR A CARGO PLANE

This application claims the benefit of U.S. Provisional Application No. 61/060,819 filed 6 Jun. 2008, the entire contents of each of which are hereby incorporated by reference.

Fuselage cell structures of modern aircraft, more particularly present day cargo planes, are designed with regard to their mechanical structure so that they can come through considerable manoeuvre- and squall-induced deformations which must however still lie within the permissible maximum loads. Furthermore additional thermal expansions of the fuselage cell occur in dependence on the fuselage length and temperature fluctuations. Both the thermally conditioned and load-induced changes in the length of the fuselage cell reach significant magnitudes which in conjunction with unfavourable situations can add maximum values of up to 3-4 mm per metre of fuselage length.

Particularly in the case of cargo planes where lower demands are made on the aerodynamics, attached parts, for example parts of an incompletely retractable landing gear or the like are often provided outside of the fuselage cell in order to maximise the cargo area. These attached parts require a cover panel in order to reduce the air resistance and at the same time provide protection against weather factors. Furthermore the cover panels are to have sufficient puncture strength to protect against foreign bodies. In order to enable access for maintenance and inspection work inside the cover panel maintenance openings or maintenance flaps are also frequently provided.

In order to ensure unrestricted movement of the fuselage cell in all operating states including critical flight manoeuvres sufficient mechanical isolation is required between the cover panel and fuselage cell which can only be achieved with limited extent with the known exterior cover panel bindings.

The object of the invention is to manufacture a cover panel, more particularly a landing gear cover panel for a cargo plane, which permits unrestricted movement of the fuselage cell in wide ranges.

This is achieved through a cover panel having the features of patent claim 1. Advantageous designs of the cover panel form the subject of the further patent claims.

By attaching the at least one flap by means of at least one multi-articulated joint, more particularly a piano hinge, to a fuselage cell of the aircraft a good mechanical isolation effect is achieved between the cover panel and operationally conditioned deformations of the aircraft fuselage cell. The cover panel according to the invention furthermore has at least one pivotal lockable access flap, in order to facilitate or even enable for example maintenance, inspection and repair work to landing gear components mounted inside the cover panel.

In a preferred embodiment the at least one multi-articulated joint is formed with a number of individual joints arranged linearly in a row and having a common pivotal axis or shaft. This produces high rigidity along the axis.

In a further advantageous design it is proposed that at least one individual joint, more particularly a middle individual joint, is designed substantially play-free and individual joints arranged either side thereof preferably have increasing play in order to enable the fuselage cell to move substantially along a longitudinal axis of the aircraft in relation to the multi-articulated joint. The mechanical isolation between the external cover panel and the fuselage cell of the aircraft which is necessary as a result of the high inherent deformations of the fuselage cell during flight operation is thereby achieved. The multi-articulated joint has essentially only one middle "fixed" individual joint, that is the middle individual joint is only able to pivot about the longitudinal axis of the aircraft and is moreover designed play-free.

A further development of the invention proposes that starting from the at least one middle individual joint the play increases towards the two outer individual joints. The mechanical play preferably increases linearly symmetrically relative to the two outermost individual joints starting from the middle individual joints whereby as a rule an optimum mechanical isolation is achieved in relation to the deformation movements of the fuselage cell. Alternatively it is likewise possible to provide a change in the mechanical play within the individual joints in the direction of the x-axis which deviates from a linear rise, for example in the form of an exponential variation.

In the drawings.

In the drawings the same structural elements each have the same reference numerals.

Figure 1:
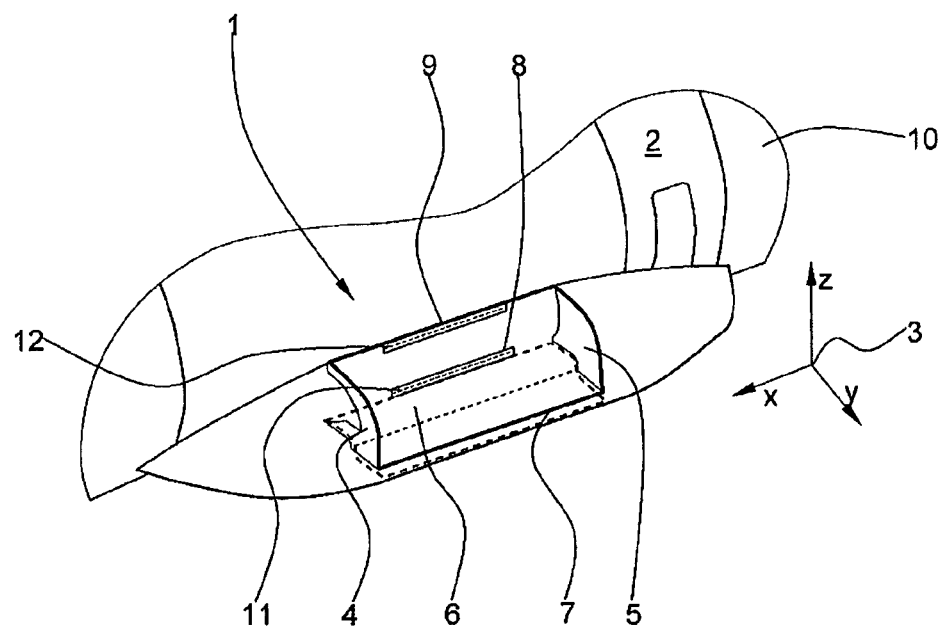
FIG. 1 shows a cover panel with two flaps in a perspective view.

FIG. 1 shows the perspective view of a cover panel for landing gear components. The cover panel 1 is fixed at the side on a fuselage cell 2 of an aircraft and in the illustrated embodiment serves for the aerodynamic cover panel of landing gear components and/or other functional groups (not shown) which lie in at least some areas outside of the fuselage cell 2. A three-dimensional coordinate system 3 with an x-axis, y-axis as well as a z-axis shows the position of all components in space. Three-dimensionally the aircraft longitudinal axis hereby runs parallel to the x-axis, the aircraft vertical axis lies parallel to the z-axis and the aircraft transverse axis runs in the direction of the y-axis.

A front and a rear stiffening frame 4, 5 are mounted inside the cover panel 1. Furthermore the cover panel 1 has two flaps 6, 7 which are each attached to the fuselage cell by means of a multi-articulated joint 8, 9. The lower and upper flap 6, 7 enable free access to the landing gear components located inside the cover panel 1. The multi-articulated joints 8, 9 are fixed on an exterior skin 10 of the fuselage cell 2. The multi-articulated joints 8, 9 are each so-called "piano hinges" which are formed with a number of individual joints which lie in a row in succession and are mounted linearly side by side on a common shaft 11, 12.

Figure 2:
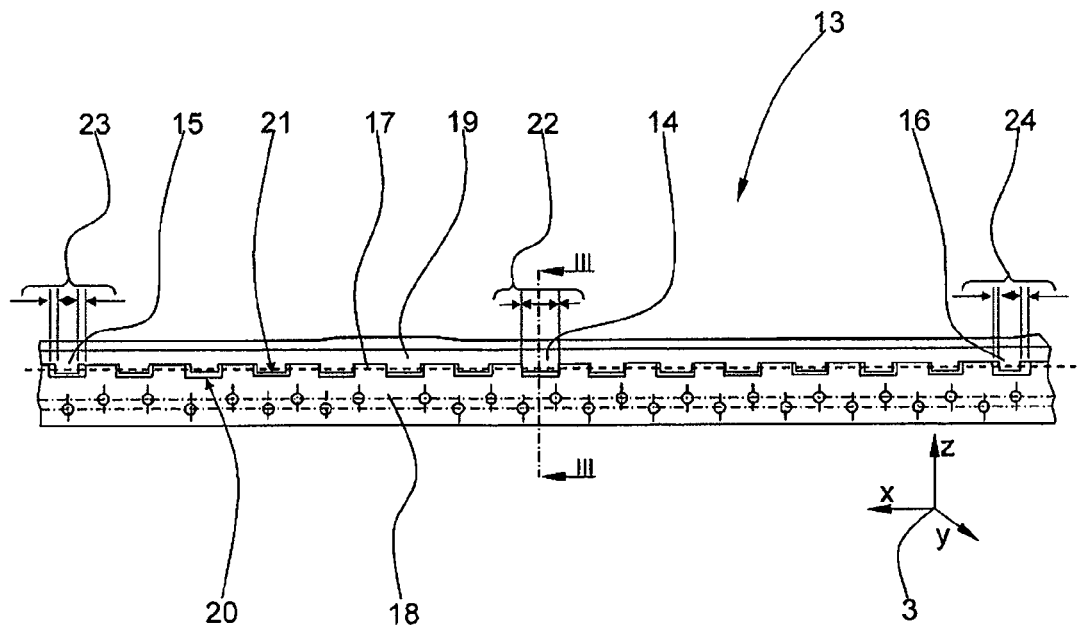
FIG. 2 shows diagrammatically in plan view a multi-articulated joint used for coupling on the flaps.

FIG. 2 illustrates diagrammatically a plan view of a multi-articulated joint ("piano hinge") designed according to the invention for the articulated connection of the upper flap 7. A multi-articulated joint 13 comprises a number of individual joints of which a middle individual joint 14 as well as the two outer individual joints 15, 16 are provided with a reference numeral. All the individual joints swivel about a common shaft 17 or are mounted linearly adjoining one another on this shaft. The shaft 17 runs through all the individual joints parallel to the x-axis of the coordinate system 3. The multi-articulated joint 13 furthermore has two hinge bands 18, 19 which are used for attaching to the fuselage cell 2 and the flaps 6, 7. Each longitudinal side 20, 21 of the bands 18, 19 have repeating rectangular-shaped projections and recesses respectively, not provided with a reference numeral, arranged interengaging on the shaft 17 to form the multi-articulated joint 13. According to the invention a mechanical play 22 of the middle individual joint 14 in the x-direction amounts to no more than a fraction of one mm ("roughly 0 mm"), whilst a play 23, 24 of the two outer joints 15, 16 in the said spatial direction can amount to up to some millimetres. The mechanical play 23, 24 is preferably symmetrical, that is formed the same size either side of the middle individual joint 14. The middle individual joint 14 is consequently to be regarded as "fixed" in relation to the x-axis, that is in the direction of the longitudinal axis of the aircraft or the x-axis of the coordinate system 3.

As a result of this configuration an effective mechanical isolation of the cover panel 1 from deformation movements of the fuselage cell 2 more particularly parallel to the x-axis is provided. In the illustrated embodiment of FIG. 2 the play increases uniformly, i.e. linearly, from the middle individual joint 14 towards the two outer individual joints 15, 16. The variation in the play 22 to 24 which is dependent on location is effected through different width dimensions each time of the rectangular projections and recesses respectively in the hinge bands 18, 19 of the multi-articulated joint 13 each in dependence on the middle individual joint 14. Alternatively an exponential increase in the play 23, 24 by way of example starting from the middle individual joint 14 to the two outer individual joints 15, 16 can be provided. The increase in the play can furthermore also follow other mathematical functions.

Figure 3:
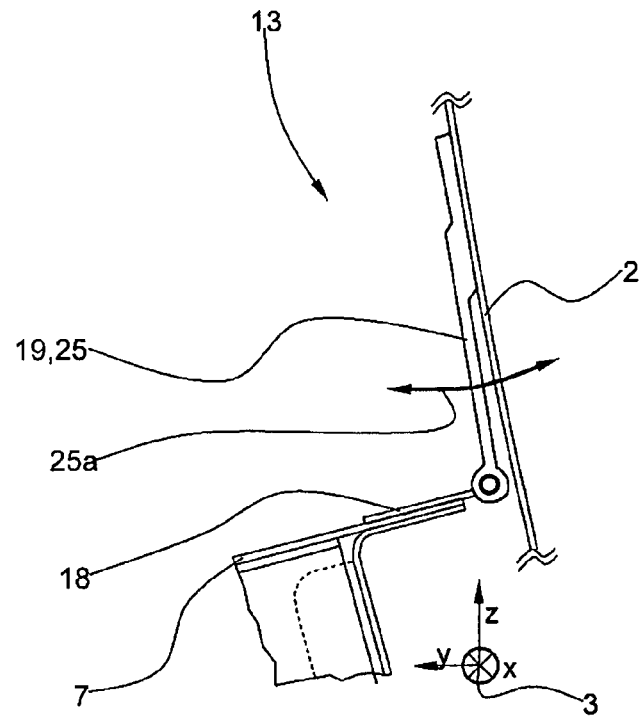
FIG. 3 shows the multi-articulated joint according to FIG. 2 in a cross-sectional view along the cross-section line III-III.

FIG. 3 shows a cross-sectional view along the cross-section line III-III of FIG. 2. The hinge band 19 of the multi-articulated joint 13 represents a lever arm 25 which is fixed on the fuselage cell 2. The lever arm 25 or hinge band 19 extends in the x-direction of the coordinate system 3 over the entire length of the multi-articulated joint 13 and has sufficient elasticity in the direction of the arrow 25a to effect an additional mechanical isolation of the cover panel 1 from movements of the fuselage cell 2 parallel to the y-axis of the coordinate system 3 or parallel to the transverse axis of the aircraft. The hinge band 18 of the multi-articulated joint 13 is connected to the upper flap 7. All the connections between the components are preferably undertaken with conventional rivet, screw, welding and/or adhesive connections.

Figure 4:
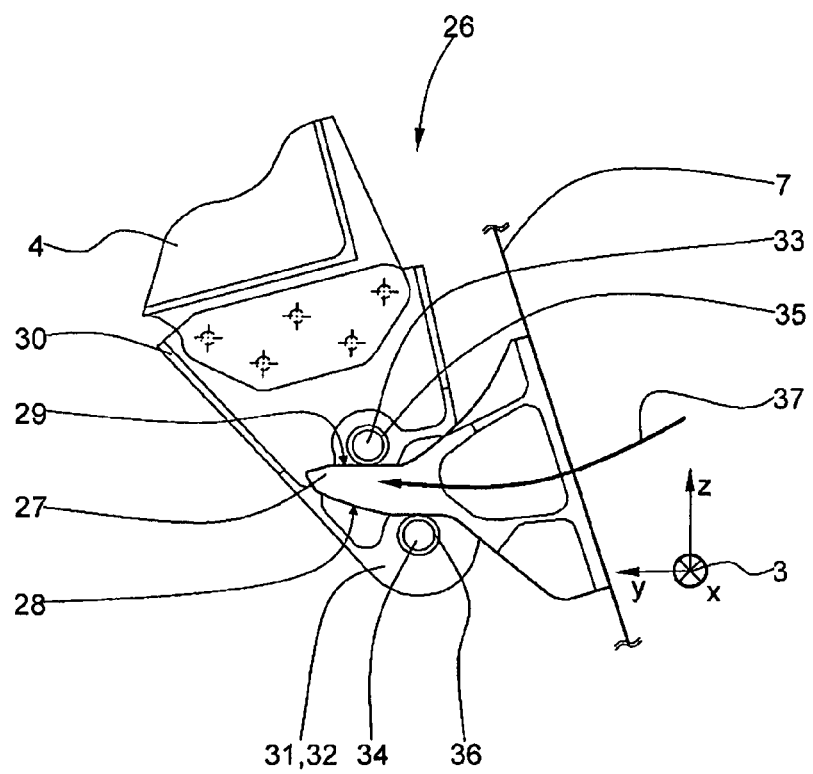
FIG. 4 shows in side view a side anti-lift mechanism for the upper flap for the z-direction.

FIG. 4 shows a sectional side view of a side anti-lift security mechanism of the upper flap in order to prevent uncontrolled lifting or flapping of the flap in the z-direction.

An anti-lift security mechanism 26 comprises a mandrel 27 which is connected in the area of a front side edge to the upper flap 7. The mandrel 27 has an upper and a lower ramp face 28, 29. In the area of a front stiffening frame 4 there is a holder 30 with a forked head 31 between whose rear arm 32 and a front arm (not shown in FIG. 4) are mounted two pivotal studs 33, 34 with rotatable sleeves 35, 36. The two pivotal studs 33, 34 are off-set slightly horizontal relative to one another in relation to the y-axis of the coordinate system 3. When swivelling up the upper flap 7 in the direction of an arrow 37 during the closing movement the mandrel 27 is guided with sliding (or rolling) action between the rotatable sleeves 35, 36. A further anti-lift security mechanism constructed corresponding to the anti-lift security mechanism 26 is located in the area of the rear stiffening frame 5 or an associated rear side edge of the upper flap 7.

In the closed state of the upper flap 7 the flap 7 is hereby reliably prevented from lifting up sideways in the z-direction, that is in the direction of the vertical axis of the aircraft, as a result of the airflow movement. This measure is required since the multi-articulated joint 13 does not extend over the entire width of the upper flap 7.

Figure 5:
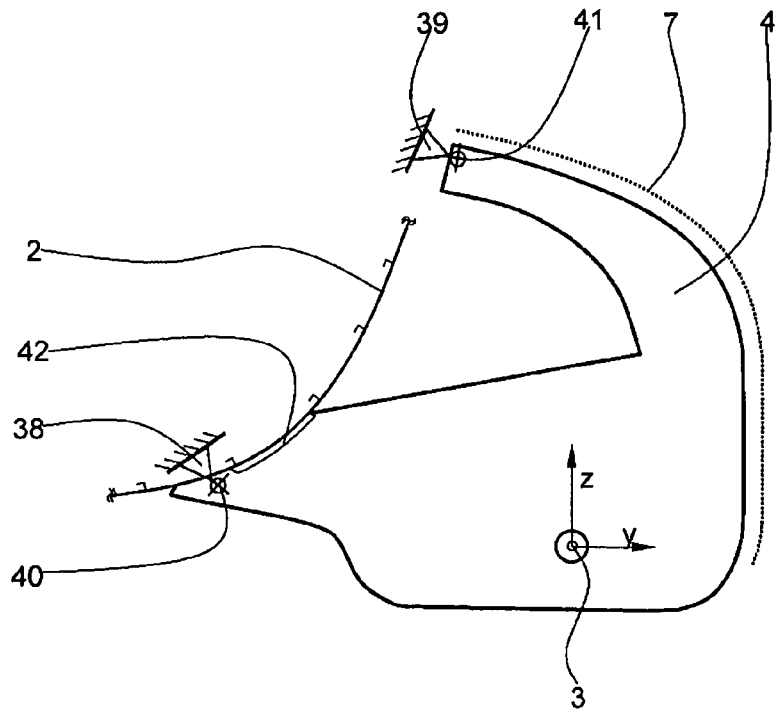
FIG. 5 shows in a side view the principle of joining on the side of the fuselage cell a front stiffening frame of the cover panel to the fuselage cell.
Figure 6:
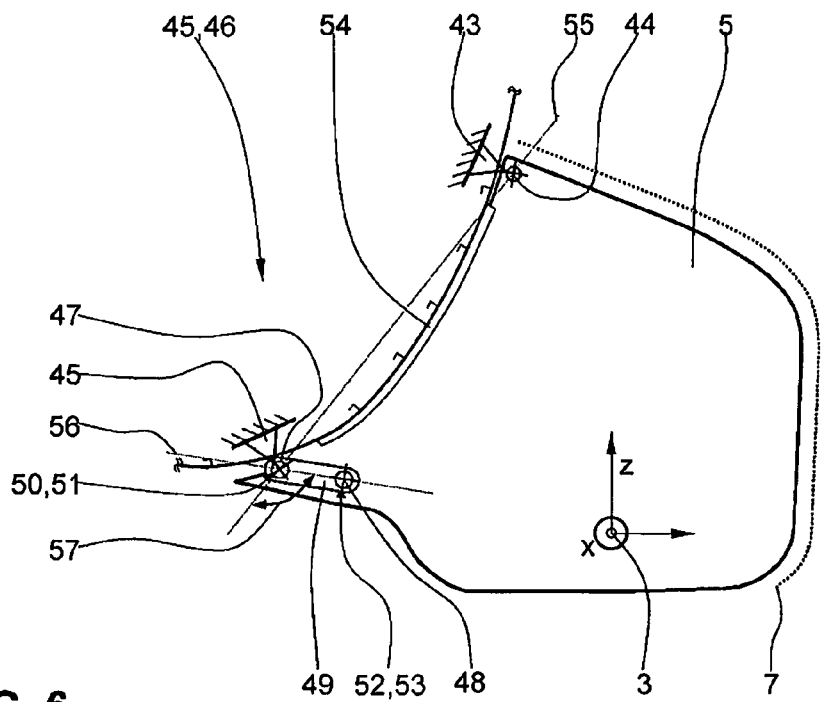
FIG. 6 shows in a side view the joining on the fuselage cell side of a rear stiffening frame of the cover panel.

In a further continuation of the specification reference is also made to FIGS. 5 and 6. FIG. 5 shows a diagrammatic side view of the front stiffening frame 4 whilst FIG. 6 shows a view of the rear stiffening frame 5.

The front stiffening frame 4 is fitted by two fixed bearings 38, 39 onto the fuselage cell 2. The term "fixed bearing" means in this context that the two fixed bearings 38, 39 permit slight pivotal movements of the front stiffening frame 4 about the fulcrums 40, 41 parallel to the x-axis of the coordinate system 3, but are however fixed in respect of all other directions of movement three-dimensionally, that is can transfer forces and moments.

The two fixed bearings 38, 39 can be produced for example with two forked holders each fixed on the fuselage cell 2 and in which a pivotal stud or cross bolt is inserted and secured. By means of the two pivotal studs or cross bolts two eyes fixed on the front stiffening frame 4 become attached with which the upper flap 7 is joined to the fuselage cell 2. Inside the cover panel 1 there is furthermore a T-profile section 42 fixed on the fuselage cell 2 in order additionally to take up displacement movements of the front stiffening frame 4 parallel to the x-axis of the coordinate system 3, that is in or against the flight direction of the aircraft.

The rear stiffening frame 5 is likewise connected in an upper area (not designated) with articulated movement to the fuselage cell 2 by a fixed bearing 43 which has a fulcrum 44. As opposed to this a lower area of the rear stiffening frame 5 is joined to the fuselage cell 2 by a pivotal bearing 45 which is designed as a pendulum support 46. The pivotal bearing 45 has two fulcrums 47, 48. An oval bracket plate 49 with a first bore 50 is attached for swivel movement on a pivotal stud 51 fixed on the fuselage cell 2, and thus forms the first fulcrum 47. At the end of the bracket plate 49 pointing away from the first bore 50 is a second bore 52 in which a pivotal stud 53 connected to the rear stiffening frame 5 is fitted with swivel movement to provide the second fulcrum 48.

The structural design of the pivotal bearing 45 or pendulum support 46 explained above enables slight movements of the rear stiffening frame 5 in relation to the fuselage cell 2 roughly parallel to the y-axis and to the z-axis of the coordinate system 3. However the pendulum support 46 is to be regarded as "fixed" in relation to the forces acting substantially parallel to the x-axis. The movements of the rear stiffening frame 5 parallel to the x-axis are additionally taken up by a T-profile 54 mounted on the fuselage cell 2.

A first subsidiary line 55 is placed through the relevant middle points of the two fulcrums 44, 47 whilst a second subsidiary line 56 runs through the fulcrums 47, 48 of the pivotal bearing 45. The two subsidiary lines 55, 56 intersect in the first fulcrum 47 and hereby include an angle 57 which in the illustrated embodiment comes close to the ideal angle of about 90° from the static respect.

Furthermore both the cover panel 1 and also the two flaps 6, 7 are structurally designed through the material used and geometric configuration so that the said components have a certain inherent flexibility for the additional compensation of fuselage cell movements.

The design according to the invention of the connection between the cover panel 1 and the fuselage cell 2, which is implemented substantially with the movable joining concepts explained diagrammatically in FIGS. 2 to 6, enables for a first time a practically complete mechanical isolation of fuselage cell movements of the aircraft from the exterior landing gear cover panel 1.

REFERENCE NUMERALS

1 Cover panel
2 Fuselage cell
3 Coordinate system
4 Stiffening frame (front)
5 Stiffening frame (rear)
6 Flap (lower)
7 Flap (upper)
8 Multi-articulated joint (so-called "piano hinge")
9 Multi-articulated joint (so-called "piano hinge")
10 Exterior skin
11 Shaft
12 Shaft
13 Multi-articulated joint
14 Individual joint (middle)
15 Individual joint (outer left)
16 Individual joint (outer right)
17 Shaft
18 Hinge band
19 Hinge band
20 Longitudinal side
21 Longitudinal side
22 Play (≈0 mm)
23 Play (>0 mm)
24 Play (>0 mm)
25 Lever arm (elastic)
25a Arrow
26 Anti-lift security mechanism
27 Mandrel
28 Ramp face (lower)
29 Ramp face (upper)
30 Holder
31 Forked head
32 Arm
33 Pivotal stud
34 Pivotal stud
35 Sleeve
36 Sleeve
37 Arrow
38 Fixed bearing (upper)
39 Fixed bearing (lower)
40 Fulcrum
41 Fulcrum
42 T-profile
43 Fixed bearing
44 Fulcrum (Fixed bearing)
45 Pivotal bearing
46 Pendulum support
47 Fulcrum (pivotal bearing)
48 Fulcrum (pivotal bearing)
49 Bracket plate
50 First bore
51 Second bore
52 Pivotal stud
53 Pivotal stud
54 T-profile
55 First subsidiary line
56 Second subsidiary line
57 Angle

The invention claimed is:

1. Cover panel for an aircraft, with at least one pivotal closable flap characterised in that the at least one flap is attached for swivel movement to a fuselage cell of the aircraft by at least one multi-articulated joint,
   wherein the at least one multi-articulated joint is formed with a number of linearly adjoining individual joints; and
   wherein at least one individual joint of the linearly adjoining individual joints is designed substantially play-free and one or more of the linearly adjoining individual joints adjoining the at least one individual joint on either side have an increasing play in order to enable displacement of the fuselage cell substantially along an aircraft longitudinal axis in relation to the multi-articulated joint.

2. Cover panel according to claim 1, characterised in that the linearly adjoining individual joints have a common shaft.

3. Cover panel according to claim 1 characterised in that the at least one individual joint comprises at least one middle individual joint, and the play increases in particular uniformly starting from the at least one middle individual joint towards one or more outer individual joints of the linearly adjoining individual joints.

4. Cover panel according to claim 1 characterised in that the at least one flap has at least one anti-lift security mechanism which is operative in a closed state of the flap.

5. Cover panel according to claim 1 characterised in that a hinge band of the multi-articulated joint represents a lever arm by which the multi-articulated joint is fixed on the fuselage cell elastically resiliently substantially in the direction of an aircraft transverse axis.

6. Cover panel according to claim 1 characterised in that the cover panel has at least one front and one rear stiffening frame.

7. Cover panel according to claim 6 characterised in that the front stiffening frame is joined to the fuselage cell by two fixed bearings.

8. Cover panel according to claim 6 characterised in that the rear stiffening frame is joined to the fuselage cell by a fixed bearing and a pivotal bearing, wherein the pivotal bearing permits movements of the cover panel along the aircraft transverse axis and an aircraft vertical axis.

9. Cover panel according to claim 6 characterised in that the two stiffening frames each adjoin in at least some areas at least one profile, more particularly a T-profile mounted in the area of the fuselage cell.

10. Cover panel according to claim 1, wherein the at least one multi-articulated joint comprises a piano hinge.

11. Cover panel according to claim 1, wherein the at least one individual joint of the linearly adjoining individual joints comprises at least one middle individual joint.

12. Cover panel according to claim 8, wherein the pivotal bearing comprises a pendulum support.

* * * * *